(12) United States Patent  (10) Patent No.: US 8,485,928 B2
Adachi et al.  (45) Date of Patent: Jul. 16, 2013

(54) SILENT CHAIN

(75) Inventors: Shouhei Adachi, Osaka (JP); Takayuki Morimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 351 days.

(21) Appl. No.: 12/876,293

(22) Filed: Sep. 7, 2010

(65) Prior Publication Data

US 2011/0065542 A1 Mar. 17, 2011

(30) Foreign Application Priority Data

Sep. 17, 2009 (JP) ................................ 2009-215709

(51) Int. Cl.
*F16G 13/04* (2006.01)

(52) U.S. Cl.
USPC .......................................................... 474/215

(58) Field of Classification Search
USPC .......................... 474/212, 206, 214, 215, 216
See application file for complete search history.

(56) References Cited

U.S. PATENT DOCUMENTS

| 4,227,425 A * | 10/1980 | Bendall ........................ 474/213 |
| 4,650,445 A * | 3/1987 | Mott ............................ 474/201 |
| 4,708,701 A * | 11/1987 | Cole, Jr. ...................... 474/245 |
| 4,764,158 A * | 8/1988 | Honda et al. ................. 474/212 |
| 4,911,682 A * | 3/1990 | Ivey et al. .................... 474/245 |
| 5,073,154 A * | 12/1991 | Ivey et al. .................... 474/213 |
| 5,372,554 A * | 12/1994 | Okuda ......................... 474/206 |
| 5,464,374 A * | 11/1995 | Mott ............................ 474/224 |
| 5,941,059 A * | 8/1999 | Kanehira et al. ............... 59/5 |
| 6,142,903 A * | 11/2000 | Heinrich ...................... 474/215 |
| 6,334,828 B1 * | 1/2002 | Suzuki .......................... 474/212 |
| 6,439,378 B1 * | 8/2002 | MacLachlan ................. 198/850 |
| 6,485,385 B2 * | 11/2002 | Shimaya ....................... 474/213 |
| 6,575,863 B2 * | 6/2003 | Skurka et al. ................. 474/215 |
| 6,595,882 B2 * | 7/2003 | Bubel et al. ................... 474/212 |
| 6,733,410 B2 * | 5/2004 | Saito ............................ 474/212 |
| 6,749,059 B2 * | 6/2004 | Gundlach et al. ............. 198/851 |
| 7,056,248 B2 * | 6/2006 | Butterfield ................... 474/212 |
| 7,497,795 B2 * | 3/2009 | Tohara et al. ................. 474/212 |
| 2002/0061800 A1 * | 5/2002 | Saito ............................ 474/212 |
| 2002/0072444 A1 * | 6/2002 | Matsuno et al. .............. 474/215 |
| 2002/0128102 A1 * | 9/2002 | Bubel et al. ................... 474/212 |
| 2002/0173393 A1 * | 11/2002 | Skurka et al. ................. 474/215 |
| 2003/0236145 A1 * | 12/2003 | Ledvina et al. ............... 474/215 |
| 2004/0214673 A1 * | 10/2004 | Bachmair ..................... 474/212 |
| 2007/0072720 A1 * | 3/2007 | Nagao .......................... 474/213 |

FOREIGN PATENT DOCUMENTS

| JP | 2000-329199 | 11/2000 |
| JP | 2008-138789 | 6/2008 |

* cited by examiner

*Primary Examiner* — William A Rivera
*Assistant Examiner* — Henry Liu
(74) *Attorney, Agent, or Firm* — Howson & Howson LLP (57) ABSTRACT

In a chain transmission incorporating a silent chain engaged with a sprocket, the plates of the chain are connected by sets of rocker pins extending through pin holes in the plates. The pin holes are elongated toward the center of each plate, and the elongation of each pin hole is greater than the maximum amount by which the distance between points on the respective rocker pins of each set increases when said chain is inflected to the maximum extent permitted by the sprocket in a portion of the chain in seating engagement with said sprocket.

8 Claims, 11 Drawing Sheets

SILENT CHAIN

CROSS REFERENCE TO RELATED APPLICATIONS

This application claims priority on the basis of Japanese Patent Application No. 2009-215709, filed on Sep. 17, 2009. The disclosure of Japanese Patent Application No. 2009-215709 is incorporated by reference in its entirety.

FIELD OF THE INVENTION

This invention relates to a silent chain for use as a timing chain in an internal combustion engine or for power transmission in various kinds of machinery. The invention relates more specifically to a silent chain arranged to reduce or avoid hitting sounds generated when teeth on the plates of the chain first come into contact with sprocket teeth as the chain moves into engagement with a sprocket.

BACKGROUND OF THE INVENTION

In general, a silent chain is composed of a plurality of guide row plates, sometimes referred to as "middle" plates and link row plates, sometimes referred to as "inner" plates. In most silent chains, each such plate has a pair of pin holes and a pair of teeth. The plates are arrayed respectively in guide rows, and non-guide rows also referred to as "link rows." The plates of the guide rows and the link rows are interleaved in alternating relationship in such a way that the pin holes of the plates of each guide row overlap pin holes of the plates of two adjacent link rows. Guide plates, each having a pair of pin holes, are disposed at outermost sides of the guide rows. The rows of plates are connected by connecting pins that extend through the overlapping pin holes. The connecting pins can be in the form of sets of rocker pins, each set consisting of two elongated rocker pins having convex rocker surfaces facing and in engagement with each other, with one of the two pins in each set being secured at both ends to guide plates on opposite sides of the chain.

The silent chain is engaged with a sprocket in various ways depending on the shape of its teeth. There are two main types of silent chain. One is the so-called "inner flank engaging, outer flank seating" type silent chain, in which the inner flanks of the teeth of the chain contact, and slide on, the sprocket teeth as the chain approaches the sprocket. The other main type of silent chain is the so-called "outer flank engaging, outer flank seating" type silent chain, in which outer flanks of the teeth of the chain contact, and slide on, the sprocket teeth as the chain approaches the sprocket. Examples of both types of silent chain are described in laid-open Japanese Patent Applications 2008-138789 and 2000-329199, and U.S. Pat. No. 6,334,828, dated Jan. 1, 2002.

When the teeth of the respective plates of an "inner flank engaging, outer flank seating" type silent chain engage sprocket teeth, an inner flank of a tooth at the front of a plate (with reference to the direction of advance of the chain) first engages a forward flank of a sprocket tooth. Then, as the chain moves onto the sprocket, the engagement point moves along the front flank of the sprocket tooth toward the bottom of the sprocket tooth. As the chain continues to move onto the sprocket, engagement shifts from engagement of the inner flank of the front tooth with the forward flank of a sprocket tooth to engagement of the outer flanks of both teeth with the rear and front flanks respectively of sprocket teeth preceding and following the sprocket tooth first engaged. Consequently, when the plate is fully seated on the sprocket, only the outer flanks contact the sprocket teeth. In this case, an inner flank and both outer flanks of the plate contact the sprocket tooth in the process of engagement.

In the case of the "outer flank engaging, outer flank seating" type silent chain, an outer flank of a rear tooth of a plate first contacts a forward flank of a sprocket tooth, and the engagement point moves along the same flank until the plate is fully seated. On the way, the outer flank of the front tooth of the plate also engages a sprocket tooth, two teeth ahead of the tooth first engaged, and both outer flanks of the plate become seated when engagement is complete. In this case, only the outer flanks of the teeth of the plate contact sprocket teeth, and the inner flanks do not contact the sprocket teeth at all.

Figure 10:
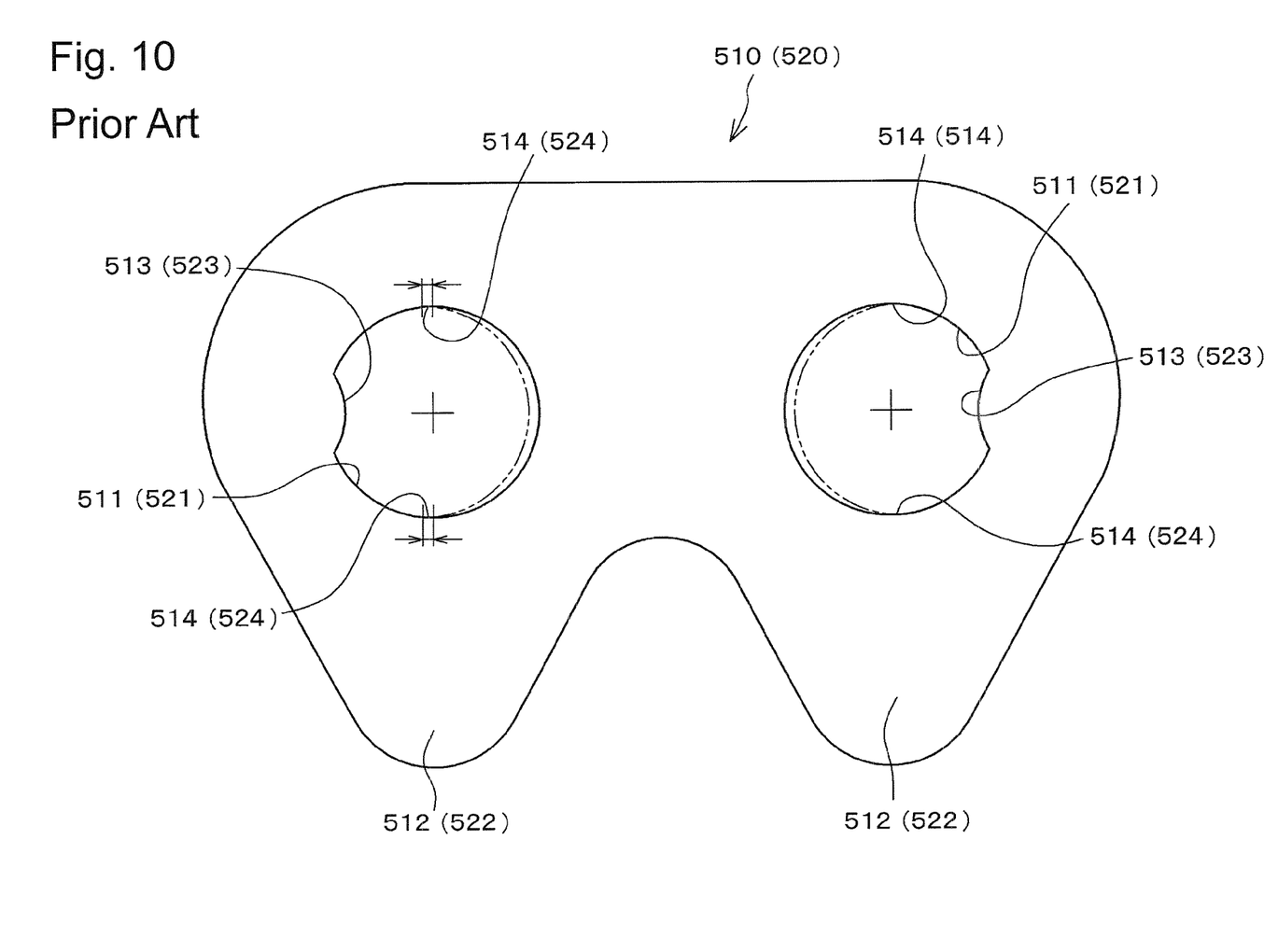
FIG. 10 is an elevational view of a guide row plate or link, row plate used in a conventional silent chain.
Figure 11:
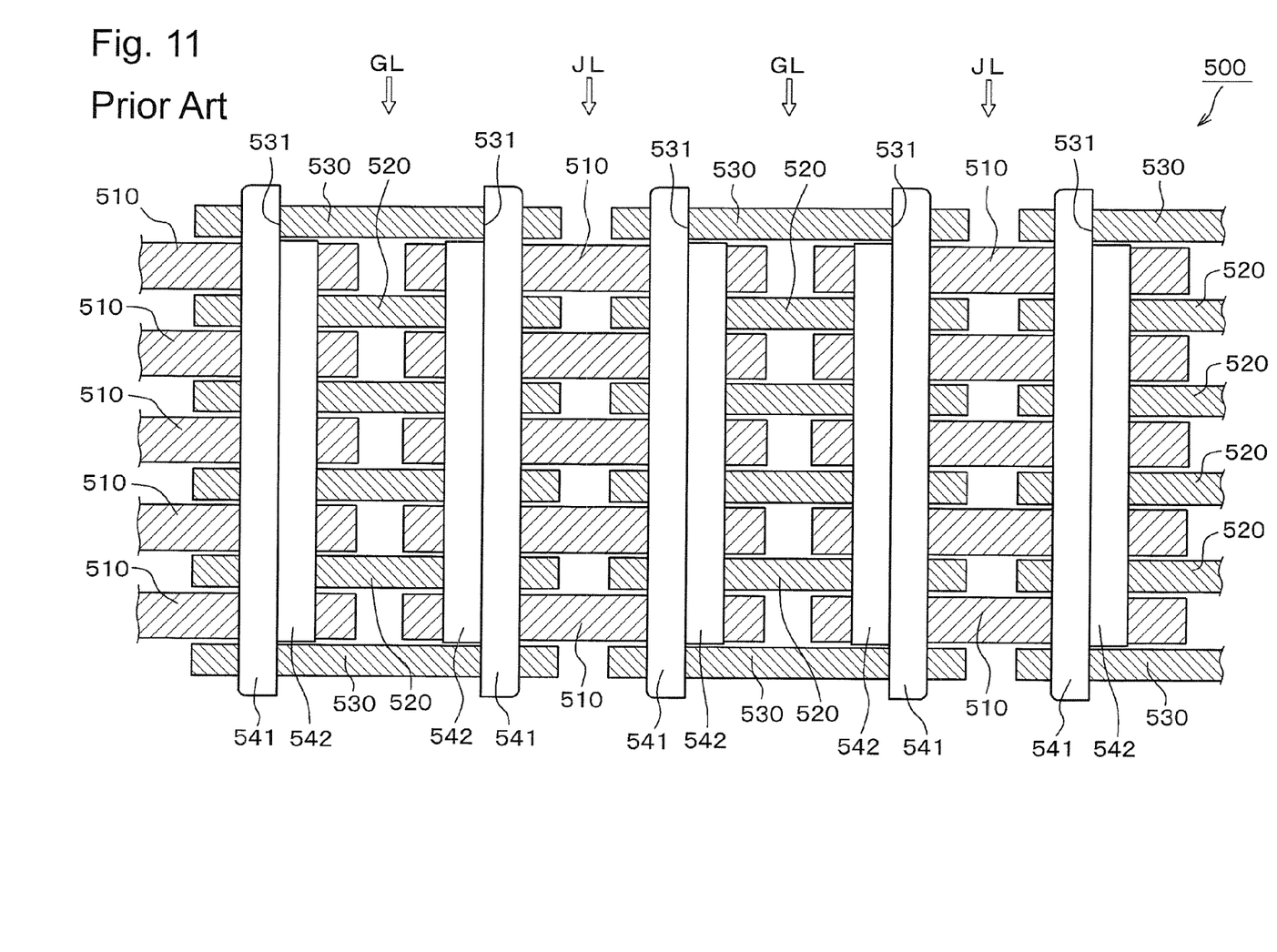
FIG. 11 is a longitudinal sectional of a part of a conventional silent chain.

FIG. 10 shows a plate of a typical prior art silent chain. The plate can be either a link row plate 510 or a guide row plate 520. If the plate is a link row plate 510, it has a pair of pin holes 511 and a pair of teeth 512, and is arranged with other similar plates in a link row JL as shown in FIG. 11. If the plate is a guide row plate 520, it has a pair of pin holes 521 and a pair of teeth 522, and is arranged along with other similar plates in a guide row GL. Guide plates, each having a pair of pin holes 531, are disposed along the sides of the chain at the outermost ends of the guide rows GL. First and second rocker pins 541 and 542, having convex circular arc-shaped rocker surfaces, are inserted into the pin holes 511 and 521 of the plates 510 and 520 with their convex rocker surfaces facing each other.

The link row plates and guide row plates 510 and 520, respectively in the link rows JL and in the guide rows GL, are arranged in alternate, interleaved, relationship as shown in FIG. 11. The first rocker pins 541 are fixed in the pin holes 531 of the guide plates 530. The second rocker pins 542 are shorter than the pins 541, and their length is slightly less than the distance between the guide plates, and they are maintained in place by engagement of their ends with the guide plates.

As shown in FIG. 10, the pin holes 511 and 521 of the link row plates and guide row plates have convex portions 513 and 523 that engage correspondingly shaped grooves formed on the rocker pins 541 and 542 to prevent rotation of the each pin relative to the plate having the convex portion with which its groove is engaged. The portions of the pin holes 511 and 521 other than the convex parts 513 and 523 are not exactly circular. The pin holes are slightly elongated by virtue of side portions 514, or 524, that give the pin holes a slightly oval shape. The purpose of the oval shape is to alleviate the force that tends to widen the pin holes in the longitudinal direction of the chain. This force is caused when the contact points of the convex arcuate surfaces of the rocker pins 541 and 542 move, and the distance between the portions of the two rocker pins furthest from the contact points increases slightly, as described in Japanese laid-open patent application Hei. 10-122309.

In both types of silent chain, the link row plates 510 move longitudinally relative to the adjoining guide row plates 520 during the time from the beginning of engagement of the link row plates to seating on the sprocket. Similarly, the guide row plates 520 move longitudinally relative to the adjoining link row plates as the guide row plates become seated. These relative movements enable the teeth 512 and 522 to engage smoothly with the sprocket teeth. The extent of relative movement is generally greater in the case of an inner flank engaging, outer flank seating, type chain.

As shown in FIGS. 10 and 11, the rocker pins 541 and 542 are inserted into the pin holes 511 and 521 with only a slight gap resulting from the oval shape due to the slight elongation corresponding to side portions 514 and 524 of the pin holes. No consideration has been given in the prior art to the problem that a large impact sound is generated when the relative movement at the beginning of engagement due to the shape of the teeth of the chain occurs as a result of a large reactive force from adjoining plates which have already been seated.

Another problem with the conventional silent is that the life of the chain is shortened by the repetitive load applied to the pins and to the pin holes by the reactive force at the beginning of engagement.

SUMMARY OF THE INVENTION

An aim of this invention is to solve the aforementioned problems by providing a silent chain that is capable of eliminating or alleviating the reactive force otherwise received from the adjoining plates when teeth of link row plates and guide row plates of the silent chain begin to engage with sprocket teeth. The silent chain of the invention exhibits reducing hitting sounds, alleviates repetitive loads, and has a longer useful life.

The invention is a silent chain transmission, a chain and at least one sprocket in driving or driven relationship with the chain. The chain includes a plurality of guide row plates and link row plates, each having a pair of pin holes and a pair of teeth. The plates are arrayed respectively in guide rows and link rows which are interleaved in alternating relationship. The pin holes of the plates of each guide row overlap pin holes of the plates of two adjacent link rows. The chain also includes guide plates, each having a pair of pin holes, disposed at outermost sides of the guide rows. Sets of rocker pins, each set consisting of two elongated rocker pins having convex rocker surfaces facing and in engagement with each other at a point of contact, extend through overlapping pin holes of the plates of a guide row and the plates of a link row interleaved with said plates of a guide row. Each pin hole of each of the guide row plates and the link row plates is elongated toward the other pin hole of the same plate, and the distances between successive points of contact of the sets of rocker pins in the chain are uniform along any straight portion of the chain when that portion of the chain is under tension. The elongation of each elongated pin hole is greater than the maximum amount by which the distance between the portions of the two rocker pins furthest from the contact point on the respective rocker pins of each set increases when the chain is inflected to the maximum extent permitted by the sprocket in a portion of the chain in seating engagement with said sprocket.

One advantage of the elongated pin hole configuration is that, if the link row plates and guide row plates move in the longitudinal direction of the chain when their teeth begin to engage sprocket teeth, the reactive force that would otherwise be received from adjoining plates is alleviated or eliminated. As a result, hitting sounds are reduced, and the alleviation of repetitive loads prolongs the useful life of the chain.

The elongated pin holes provide gaps between the edges of the pin holes and the rocker pins, which hold sufficient oil to suppress wear elongation of the chain. Suppression of wear elongation also contributes to the prolongation of the useful life of the chain.

In an embodiment of the silent chain transmission, the pin holes of the guide row plates and the link row plates can be joined, forming a single elongated opening in each of said plates. The provision of one long pin hole in each plate simplifies the manufacturing process.

In another embodiment of the silent chain transmission, each pin hole in each link row plate and each guide row plate has an elongated portion defined by an inner edge on the side of the elongated portion nearest the teeth of the plate and an outer edge on the side of the elongated portion farthest from the teeth of the plate. The outer edge is substantially straight, and configured so that, when the plate is seated on the sprocket, said outer edge is parallel to a tangent to a circle circumscribed about the tips of the sprocket teeth at the tip of the adjacent sprocket tooth on which said plate is seated. The outer edge of the pin hole therefore extends in the direction of a preceding plate seated on the sprocket. Accordingly, it is possible to alleviate or eliminate the reactive force otherwise received from the adjoining plates more steadily, to achieve a further reduction in hitting sounds, to improve the avoidance of repetitive loads otherwise applied to the rocker pins and pin holes, and to achieve still greater prolongation of the life of the chain.

In still another embodiment, the amount by which each pin hole is elongated is greater than the longest distance between successive toothed plates in the chain. The range of movement of the link row plates and guide row plates in the longitudinal direction is thereby expanded to correspond to the gaps between the ends of the plates, which limit the relative longitudinal movement of the plates of the chain. This relationship between the elongation of the pin holes and the gaps between successive plates also contributes to the steady alleviation or elimination of the reactive force otherwise received from the adjoining plates in chains of any engagement types, and to the reduction in hitting sounds, avoidance of repetitive loads, and prolongation of the life of the chain.

In still another embodiment, at least one of the rocker pins of each set is bent in a curve, whereby the distance between the rocker pins of each set varies along their lengths. The curvature of the rocker pin or pins applies a force that contracts the overall length of the chain. Accordingly, it is possible to reduce vibration that would otherwise occur due to the looseness on the slack side of the silent chain in the silent chain transmission. The curvature of the pins also contributes to the reduction of impact sounds that would otherwise be generated at the beginning the engagement of the slack side of the chain with a driven sprocket side. Finally, the curvature of the pin or pins also contributes to alleviation of repetitive loads on the rocker pins and pin holes, and to the prolongation of the useful life of the chain.

DETAILED DESCRIPTION OF THE PREFERRED EMBODIMENTS

Advantages of the silent chain transmission according to the invention can be realized in any of various embodiments. In general, the transmission comprises a chain and at least one sprocket in driving or driven relationship with the chain. The chain includes a plurality of guide row plates and link row plates, each having a pair of pin holes and a pair of teeth. The plates are arrayed respectively in guide rows and link rows which are interleaved in alternating relationship. The pin holes of the plates of each guide row overlap pin holes of the plates of two adjacent link rows. The chain also includes guide plates, each having a pair of pin holes, disposed at outermost sides of the guide rows. Sets of rocker pins, each set consisting of two elongated rocker pins having convex rocker surfaces facing and in engagement with each other at a point of contact, extend through overlapping pin holes of the plates of a guide row and the plates of a link row interleaved with said plates of a guide row. Each pin hole of each of the guide row plates and the link row plates is elongated toward the other pin hole of the same plate, and the distances between successive points of contact of the sets of rocker pins in the chain are uniform along any straight portion of the chain when the chain is in a straight condition and in tension. The elongation of each elongated pin hole is greater than the maximum amount by which the distance between the portions of the two rocker pins furthest from the contact point on the respective rocker pins of each set increases when the chain is inflected to the maximum extent permitted by the sprocket in a portion of the chain in seating engagement with said sprocket.

The silent chain in accordance with the invention has, among its advantages, that it reduces or eliminates hitting sounds, alleviates the repetitive loads otherwise applied to the rocker pins and pin holes, and prolongs the life of the chain.

As shown in FIGS. 1 through 5, in a first embodiment, a silent chain 100 is constructed by connecting plates 110 arrayed in link rows JL, and plates 120 arrayed in guide rows GL, in interleaved relationship by inserting rocker pins 141 and 142 respectively into pin holes 111 and 121, with their convex rocking surfaces facing each other.

Figure 1:
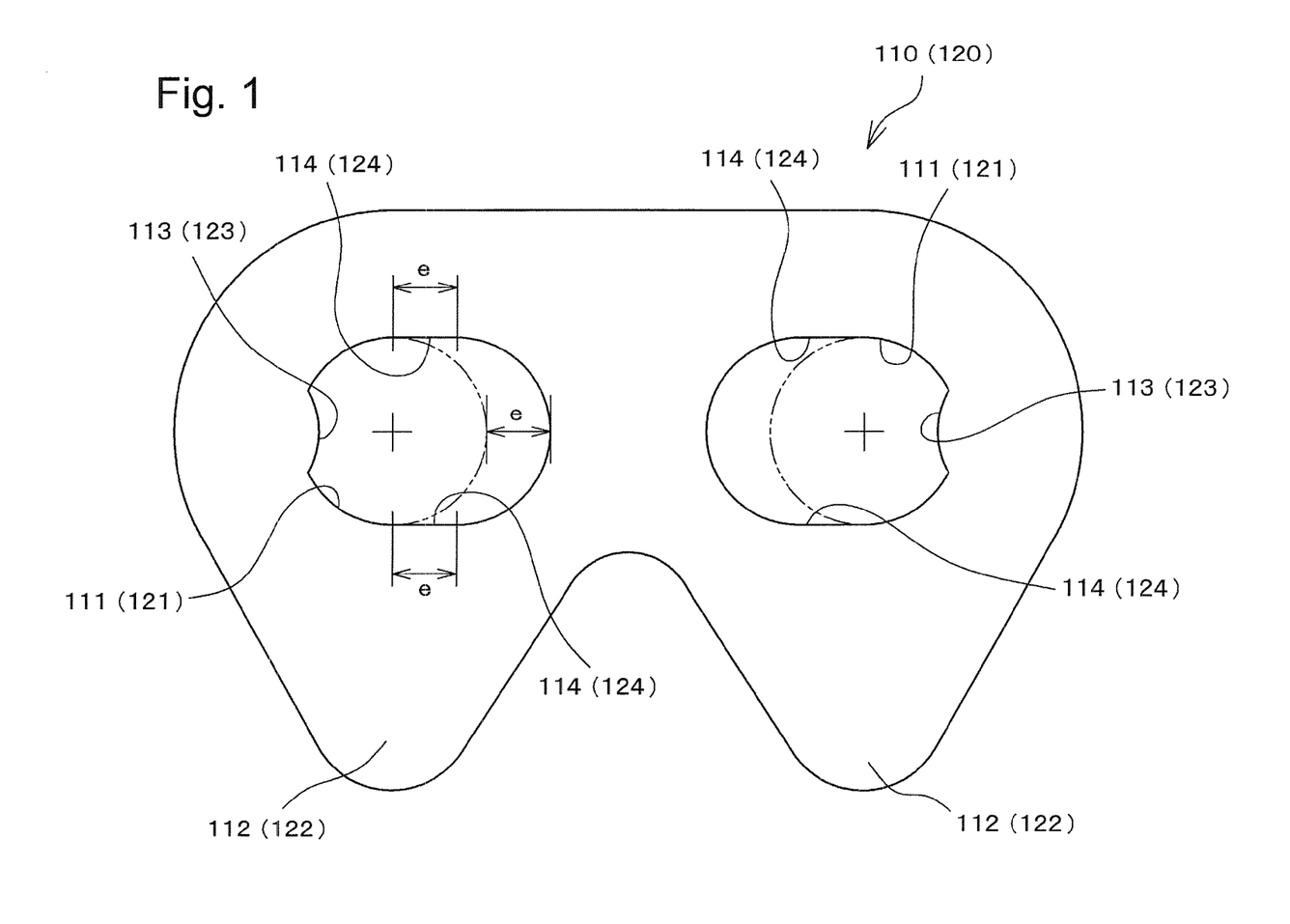
FIG. 1 is an elevational view of a guide row plate or link row plate used in a silent chain according to the invention.

As shown in FIG. 1, each of the link row plates 110 has a pair of pin holes 111, and is bifurcated to form a pair of teeth 112. Each of the guide row plates 120 similarly has a pair of pin holes 121, and is bifurcated to form a pair of teeth 122. The pin holes 111 and 121 in each plate are elongated toward the center of the plate, i.e., in an inward direction from the forward and back ends of the plate, and have long side edges 114 and 124 extending generally in the direction of elongation of the chain.

The pin holes 111 and 121 are also provided with convex portions 113 and 123 at their outer sides. These convex portions engage correspondingly shaped grooves in the long rocker pins 141 and the short rocker pins 142 (FIG. 3), so that, as the chain bends, the link row plates 110 and the rocker pins 142 inflect integrally without relative rotation, and the guide row plates 120 and rocker pins 141 also inflect integrally without relative rotation.

Figure 2:
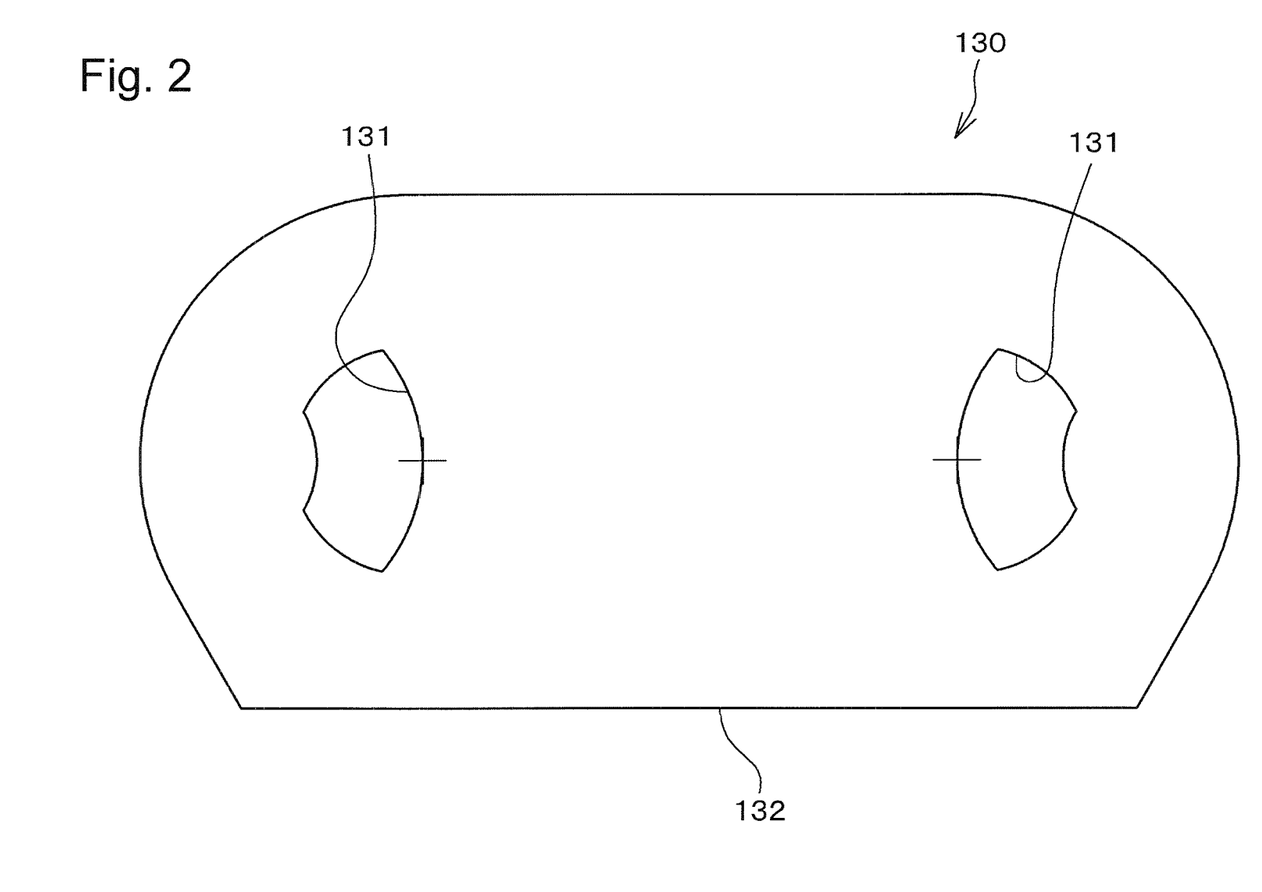
FIG. 2 is a front view of a guide plate.
Figure 3:
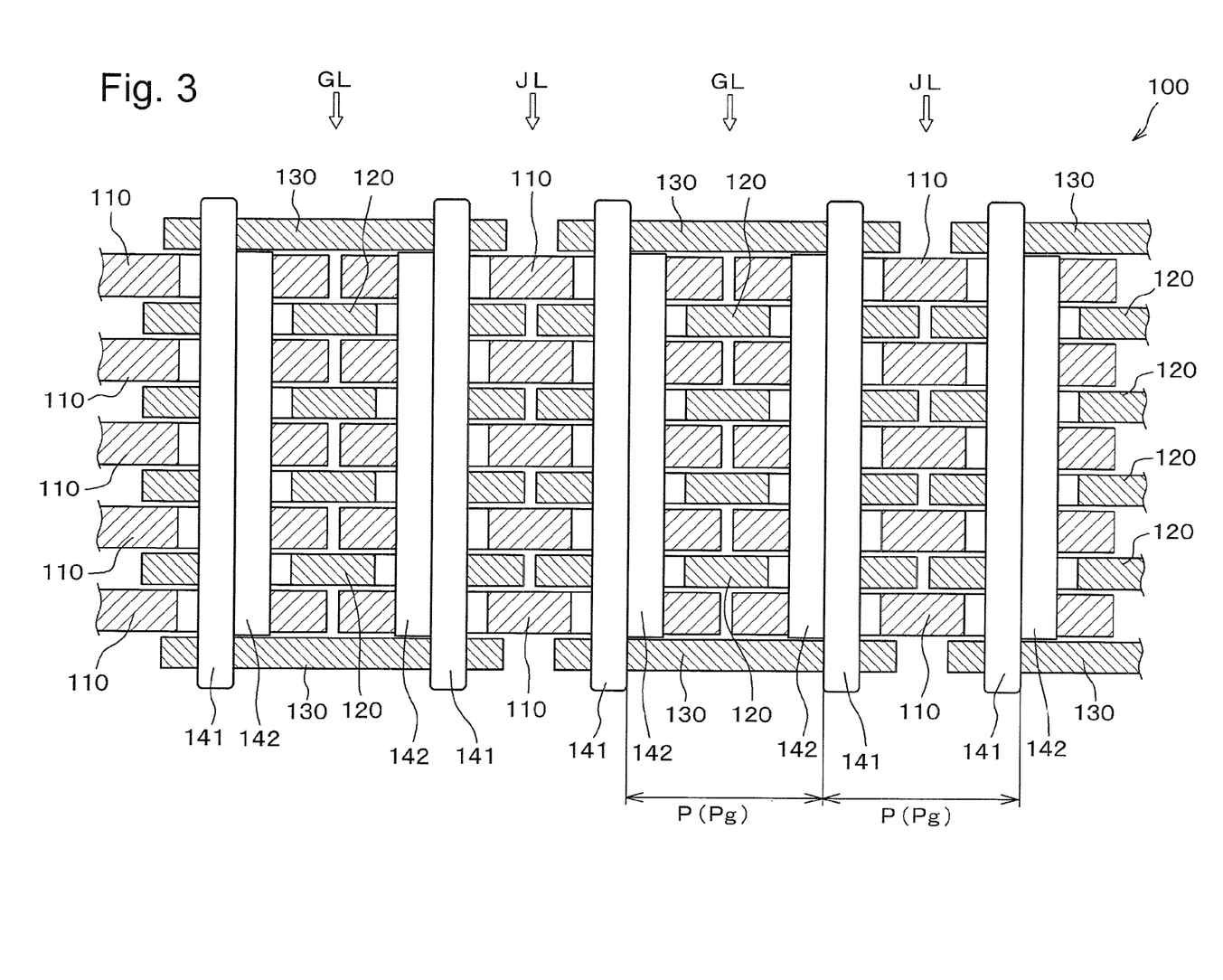
FIG. 3 is a longitudinal sectional of a part of a silent chain according to the invention.

As shown in FIG. 2, each guide plate 130 has a pair of pin holes 131, each having a shape corresponding to the cross-section of a long rocker pin 141. As shown in FIG. 3, the guide plates 130 are disposed at the widthwise outermost parts of the silent chain 100 and are fixed to the ends of the rocker pins 141. A guide portion 132 of the guide plate 130 projects in the same direction in which the teeth of the toothed plates project, and functions as a guide by engagement with the sides of sprocket teeth, thereby limiting widthwise movement of the chain when the chain 100.

As shown in FIG. 3, the silent chain 100 is constructed by arranging the guide row plates and link row plates 120 and 110 respectively in guide rows GL and link rows JL. Guide plates 130 are then disposed on the outermost parts of the guide rows GL. The link row plates 110 in the link rows JL are interleaved with the guide row plates 120 in the guide rows GL. Then, pairs of rocker pins 141 and 142 are inserted through the pin holes 111 of the link row plates 110 and pin holes 121 of the guide row plates 120 with their convex, circular, arc-shaped rocking surfaces facing each other. The long rocker pins 141 are then fixed in the pin holes 131 of the guide plates 130.

As shown in FIG. 3, when a tensile force is applied to a straight portion of the chain, the long rocker pins 141 engage the convex portions on the outer side of the pin holes of the guide row plates 120, and the shorter rocker pins 142 engage the convex portions on the outer sides of the pin holes of the link row plates 110. The convex rocking surfaces of the pins of each pair of long and short pins contact each other. The distances Pg between the successive contact points of adjoining rocker pins are equal and correspond to the chain pitch P.

The distance e shown in FIG. 1 is the amount by which the pin hole is elongated relative to a circular pin hole, and corresponds to the length of the side portions 114 and 124. The length e can be set at any appropriate value provided that it is greater than the distance between the portions of the two rocker pins furthest from the contact point increases when the chain is inflected while seated on a sprocket. The increase in the distance between these two portions of the rocker pins most remote from the contact point is the maximum amount by which the distance between two points on the respective pins can increase on inflection of the chain when wound onto a sprocket.

Figure 5:
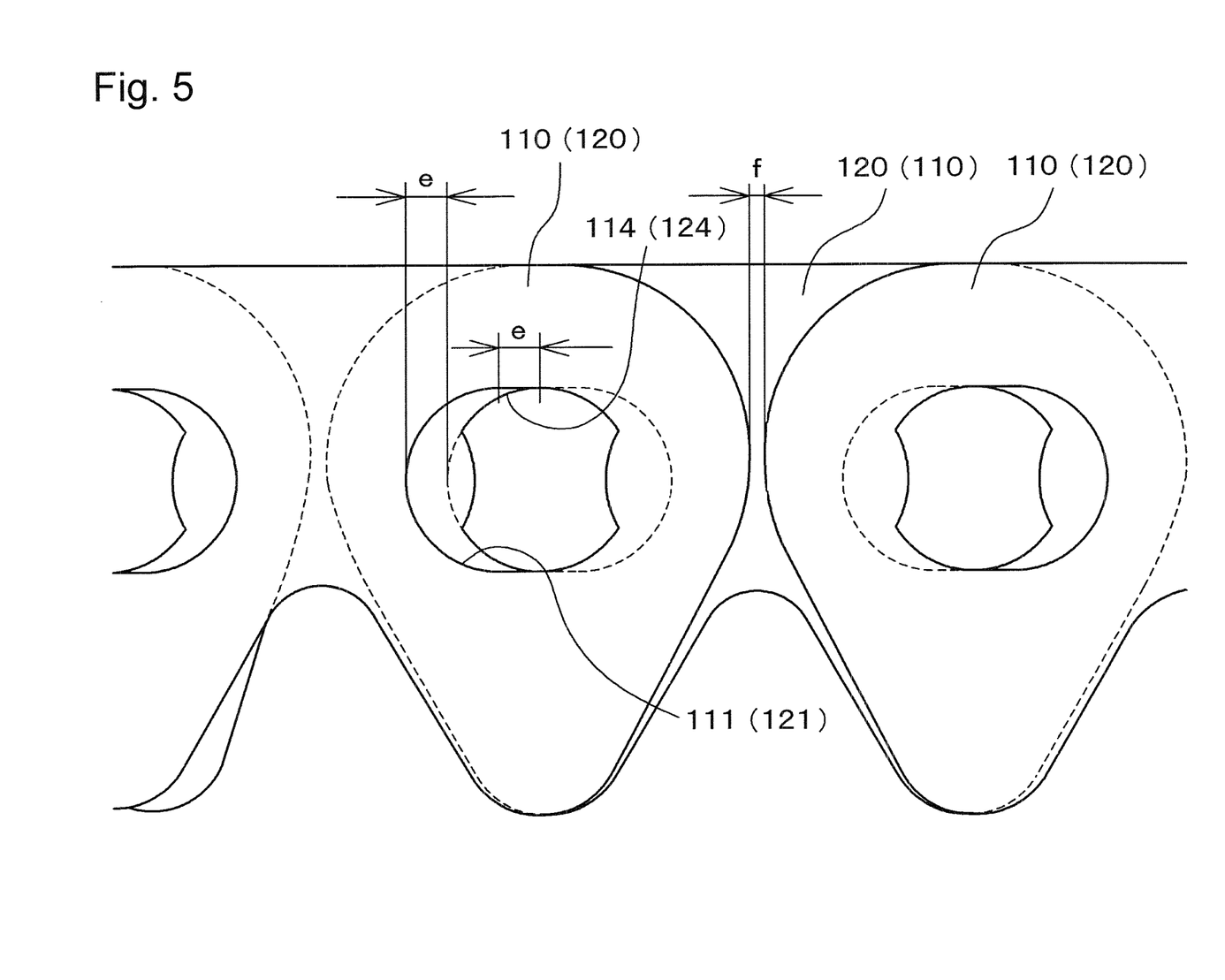
FIG. 5 is a detailed elevational view of a part of the silent chain.

As shown in FIG. 5, it is also possible to expand the range of longitudinal relative movement of the link row plates and guide row plates to the maximum physical limit allowed by the chain by setting the size e of the enlarged portions of the pin holes so that it is greater than the longitudinal distance f between the ends of successive link row plates and guide row plates.

Figure 4:
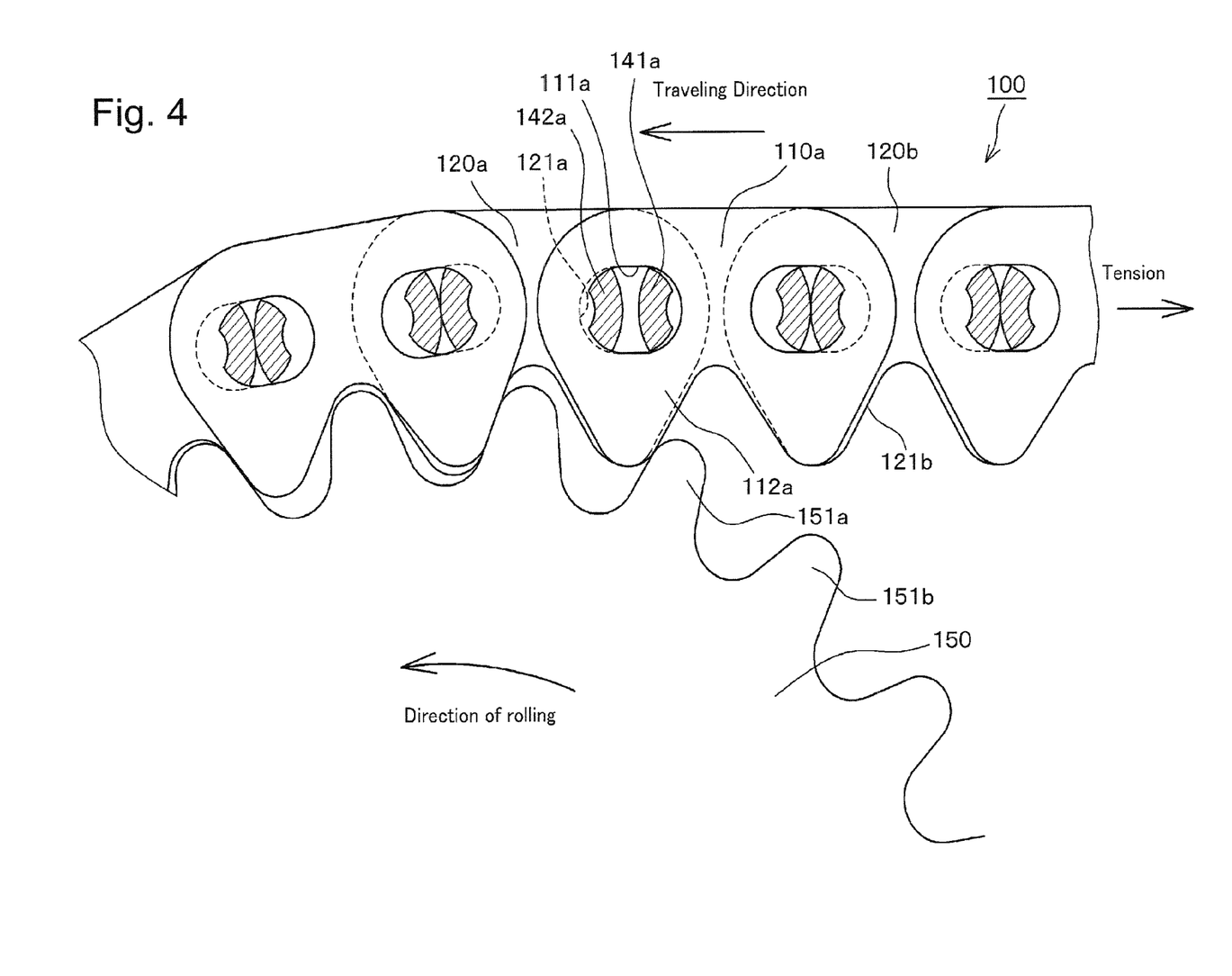
FIG. 4 is a schematic view showing the manner in which the silent chain engages with a sprocket.

The operation of the silent chain is depicted in FIG. 3. When the chain 100 is wound around a sprocket 150, and teeth 112 of link row plates 110*a* begin to engage sprocket teeth 151 as shown in FIG. 4, the inner flanks of the front teeth of the link row plates contact sprocket tooth 151*a*, and the link row plates 110*a* receive a forward driving force.

At this time, the long rocker pin 141 is movable in the elongated pin holes 111*a* of the link row plates 110*a* in the direction of the enlarged portion of the pin holes toward the rear side of the pin holes, while the shorter rocker pins 142 is movable in pin holes 121*a* of the guide row plates 120*a* in the direction of the enlarged portion toward the front side of the pin holes. Consequently, the link row plates 110*a* in the non-guide row JL can move smoothly without receiving any reactive force from the preceding guide row plates 120*a*. Accordingly, it is possible to reduce or eliminate hitting sounds that would otherwise be generated, and to alleviate repetitive loads that would otherwise be applied to the rocker pins 141*a* and 142*a* and to the pin holes 111*a* and 121*a*.

A similar operation is carried out when teeth 121*b* of the guide row plates 120*b* of the following guide row GL begin to engage sprocket tooth 151*b*. That is, when the teeth 112 and 122 of the link row plates and guide row plates 110 and 120 begin to engage the sprocket teeth 151 as the chain advances, the link row plates and guide row plates can always move smoothly without receiving any reactive force from the preceding plates. Accordingly, it is possible to reduce noises generated in driving the silent chain 100, and to prolong the useful life of the chain.

There is a case where succeeding guide row plates and link row plates can push preceding link row plates and guide row plates in the slack side of a chain when the preceding plates begin to engage a driven sprocket during high-speed rotation for example. However, the link row plates and guide row plates of the invention are not prevented by forces received from succeeding plates from smooth engagement with the sprocket, because no force is transmitted unless the plates reach the limit of their range of relative movement corresponding to spacing f, as described above with reference to FIG. 5.

Because of the spaces provided by the elongated pin holes the chain can also hold more lubricant oil than a conventional silent chain, and is therefore capable of suppressing wear elongation of the chain and thereby prolonging the useful life of the chain.

Figure 9:
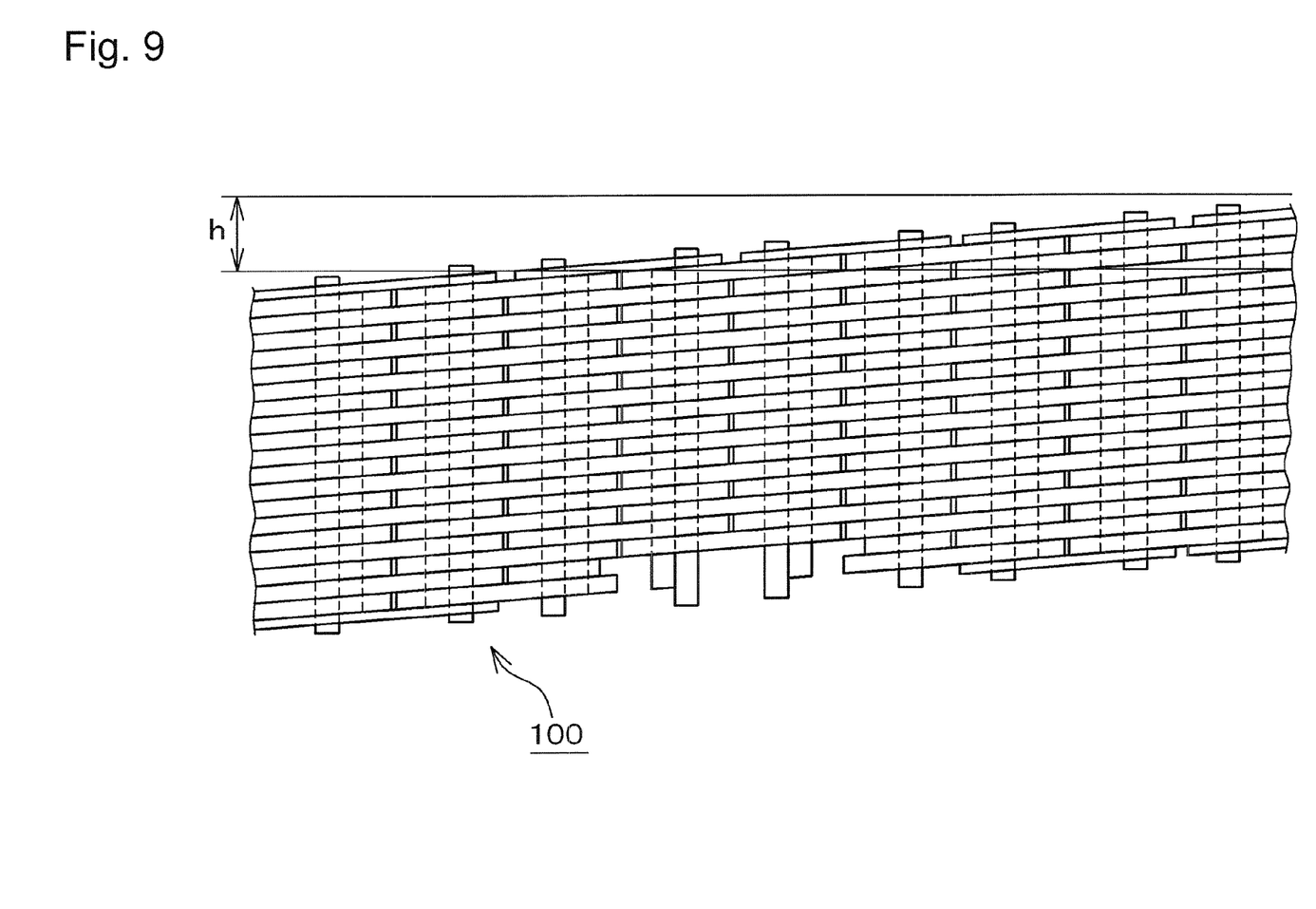
FIG. 9 is a schematic diagram showing a part of a silent chain deflected in the direction of the chain width.

The direction of movement of silent chain 100 can deviate in the chain width direction by an amount h as shown in FIG. 9 due to various causes such as misalignment of sprockets, thermal or elastic deformation of a sprocket shaft or of a chain guide, sinusoidal vibration occurring in a free span of the chain, or a bulge in the slack side of the chain during high-speed rotation. With the chain according to the invention, it is possible to accommodate the lateral deviation h, and to maintain strength and reduced noise production because of the elongation of the pin holes 111 and 121 of the link row plates and the guide row plates 110 and 120.

Figure 6:
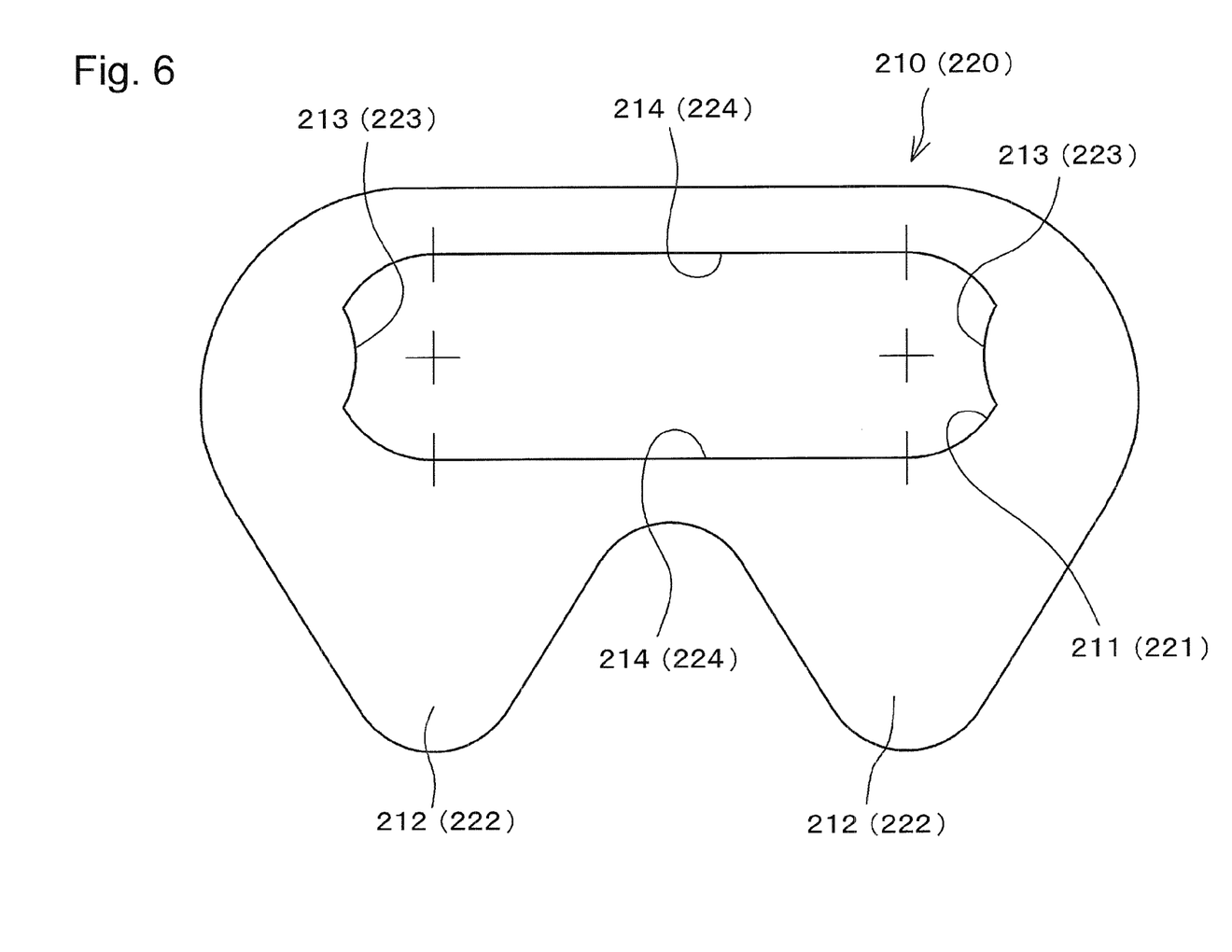
FIG. 6 is an elevational view of a guide row plate or a link row plate used in a silent chain according to a second embodiment of the invention.

In a second embodiment shown in FIG. 6, the link row plates and guide row plates 210 and 220 are formed by elongating the pin holes to an extent such that they are connected to each other forming a single, elongated opening 211 (221) the enlarged portions of which are defined by long side portions 214 (224). With the single, elongated openings, it becomes possible to simplify manufacture of the plates while still achieving the effects of the first embodiment as described above.

Figure 7A:
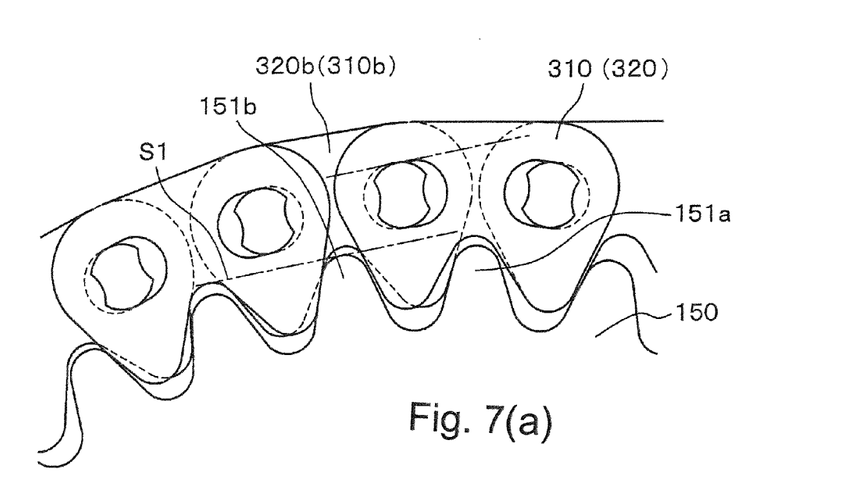
FIGS. 7(a) and 7(b) are respectively a schematic view and an enlarged auxiliary view, showing link row and guide row plates in a silent chain according to a third embodiment of the invention.
Figure 7B:
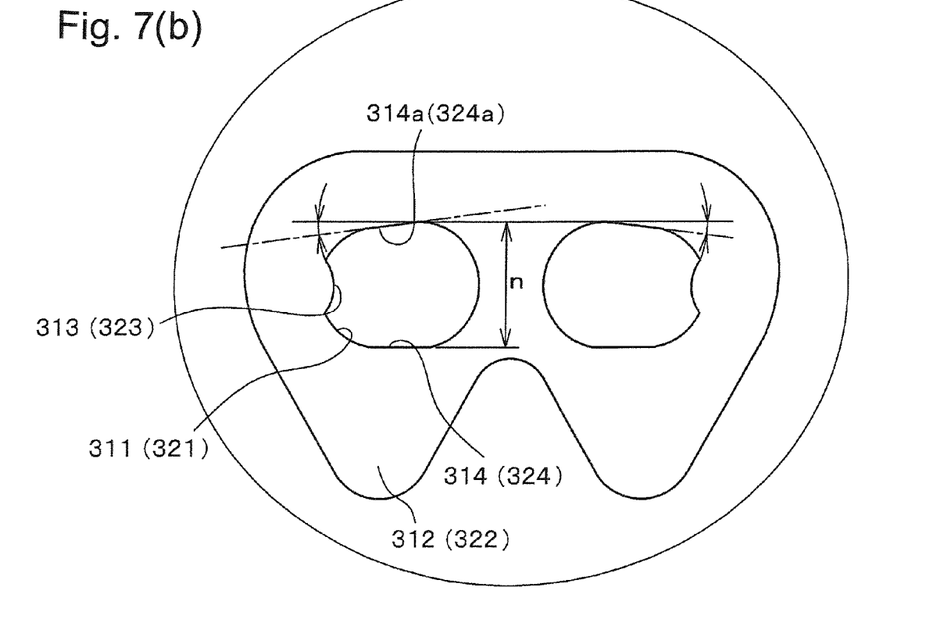

In a third embodiment, shown in FIGS. 7(a) and 7(b), link row plates and guide row plates 310 and 320 have pin holes with long upper side portions 314a and 324a, i.e., substantially straight side edges that are farthest from the teeth 312 (322). These side edges 314a and 324a are configured so that, when the plate is seated on sprocket 150, they are substantially parallel to a line S1 tangent to a circle circumscribing the tips of the sprocket teeth at the tip of the adjacent sprocket tooth 151b, on which the plate 310 or 320 is seated. Tooth 151b is the sprocket tooth situated between the front tooth of the plate having the upper side portion 314a or 324a and the rear tooth of a preceding plate aligned therewith along the longitudinal direction of the chain. Thus, sprocket tooth 151b is situated between, and engaged by, a front tooth of a plate in a link row or a guide row and the rear tooth of a preceding link plate in the same kind of row. As shown in the enlarged auxiliary view in FIG. 7, the straight outer side edge of the rear pin hole of the plate is similarly configured so that it is parallel to a line tangent to the tooth tip-circumscribing circle at a point of tangency located at the tip of the adjacent sprocket tooth on which the plate is seated, i.e., the sprocket tooth engaged by the rear tooth of the plate.

By virtue of the direction of the edges 314a and 324a of the pin holes, the holes are widened and the inner parts of the holes are enlarged to a height n. The edges 314a and 324a extend in the direction of the preceding plates 320 and 310. Accordingly, it becomes possible to alleviate or eliminate the reactive forces that would otherwise be received from the adjoining plates more steadily, thereby avoiding hitting sounds and prolonging the useful life of the chain.

Figure 8:
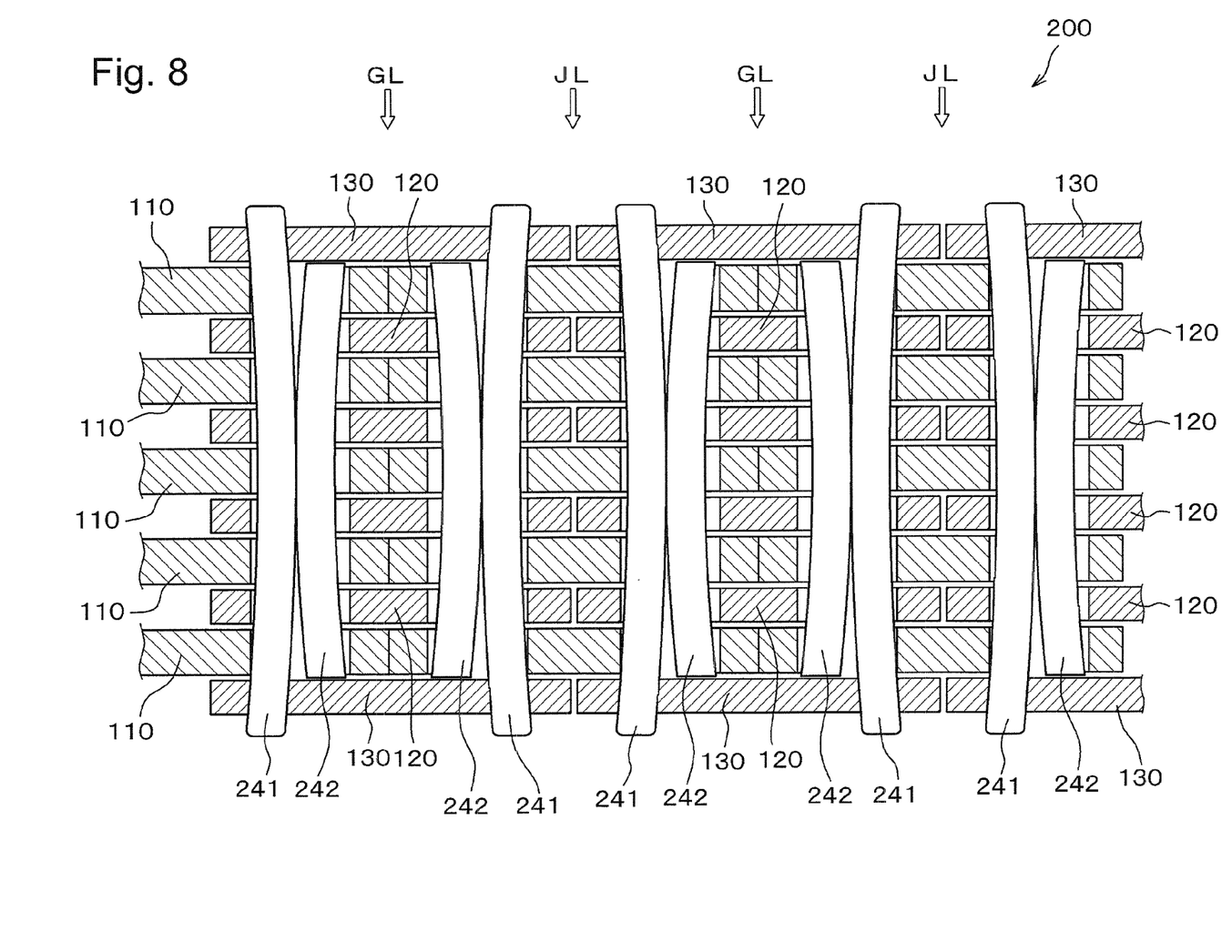
FIG. 8 is a longitudinal sectional of a part of a silent chain according to a fourth embodiment of the invention.

In still another embodiment, shown in FIG. 8, each of the long and short rocker pins 241 and 242 in a silent chain 200 is bent in a curve so that their arcuate rocking surfaces contact each other at a central contact point midway between the sides of the chain. In FIG. 8, the 200 is shown contracted to a condition in which where the pin holes of the link row and guide row plates are substantially aligned and no tensile force is applied to the chain. Fluctuations in the tensile force on the slack side of the chain can be absorbed by bending of the pins as they tend to straighten upon elongation of the chain in the longitudinal direction. Accordingly, it is possible to reduce sinusoidal vibration that would otherwise be caused by looseness of the chain, to reduce impact sounds that generated on engagement of the slack side of the chain with a driven sprocket, to alleviate repetitive loads otherwise applied to the rocker pins and pin and to prolong the life of the chain.

In a modified version of the embodiment of FIG. 8, it is possible to utilize sets of pins in which only one of the pins, e.g., the shorter pin, is bent in a curve. It is also possible to bend one or both pins so that they contact each other at two contact points near their ends rather than at a single central contact point.

What is claimed is:

1. A silent chain transmission, comprising a chain having:
   a plurality of guide row plates and link row plates, each having a pair of pin holes and a pair of teeth, each of said teeth being adjacent to one of the pin holes of said pair and having an inner flank and an outer flank, said plates being arrayed respectively in guide rows and link rows interleaved in alternating relationship with the pin holes of the plates of each guide row overlapping pin holes of the plates of two adjacent link rows;
   guide plates, each having a pair of pin holes, disposed at outermost sides of the guide rows; and
   sets of rocker pins, each set consisting of two elongated rocker pins extending through overlapping pin holes of the plates of a guide row and the plates of a link row interleaved with said plates of a guide row, said two elongated rocker pins having convex rocker surfaces that are in engagement with each other at a point of contact when the portion of the chain that includes the guide row plates and link row plates through which said two elongate rocker pins extend is under tension; and
   also comprising a sprocket in driving or driven relationship with teeth of the chain, said chain including a portion that approaches said sprocket;
   wherein each pin hole of each of the guide row plates and the link row plates is elongated toward the other pin hole of the same plate;
   wherein the inner flank of a front tooth of each link row plate that first contacts a tooth of said sprocket when in said portion of the chain that approaches said sprocket is shaped and positioned to receive a forward driving force from said tooth of said sprocket whereby said link row plate is moved forward relative to the next preceding guide row of said chain and the rocker pins that extend through the pin hole in said link row plate adjacent said front tooth separate from each other forming a gap;
   wherein the distances between successive points of contact of the sets of rocker pins in the chain are uniform along any straight portion of the chain when under tension; and wherein the elongation of each elongated pin hole is greater than the maximum amount by which the distance between the two portions of the two rocker pins furthest from the contact point on the respective rocker pins of each set increases when said chain is inflected to the maximum extent permitted by the sprocket in a portion of the chain in seating engagement with said sprocket.

2. The silent chain transmission according to claim 1, wherein the amount by which each said pin hole is elongated is greater than the longest distance between successive toothed plates in the chain.

3. The silent chain transmission according to claim 1, wherein each pin hole in each link row plate and each guide row plate has an elongated portion defined by an inner edge on the side of the elongated portion nearest the teeth of the plate and an outer edge on the side of the elongated portion farthest from the teeth of the plate, wherein said outer edge is substantially straight, and configured so that, when the plate is seated on the sprocket, said outer edge is parallel to a tangent to a circle circumscribed about the tips of the sprocket teeth at the tip of the adjacent sprocket tooth on which said plate is seated.

4. The silent chain transmission according to claim 2, wherein each pin hole in each link row plate and each guide row plate has an elongated portion defined by an inner edge on the side of the elongated portion nearest the teeth of the plate and an outer edge on the side of the elongated portion farthest from the teeth of the plate, wherein said outer edge is substantially straight, and configured so that, when the plate is seated on the sprocket, said outer edge is parallel to a tangent to a circle circumscribed about the tips of the sprocket teeth at the tip of the adjacent sprocket tooth on which said plate is seated.

5. The silent chain transmission according to claim 1, wherein the amount by which each said pin hole is elongated is greater than the longest distance between successive toothed plates in the chain.

6. The silent chain transmission according to claim 2, wherein the amount by which each said pin hole is elongated is greater than the longest distance between successive toothed plates in the chain.

7. The silent chain transmission according to claim 3, wherein the amount by which each said pin hole is elongated is greater than the longest distance between successive toothed plates in the chain.

8. The silent chain transmission according to claim 4, wherein the amount by which each said pin hole is elongated is greater than the longest distance between successive toothed plates in the chain.

* * * * *